United States Patent [19]

Watabe et al.

[11] Patent Number: 4,847,475
[45] Date of Patent: Jul. 11, 1989

[54] READ/WRITE APPARATUS FOR MAGNETIC CARD

[75] Inventors: Masayuki Watabe, Wako; Osamu Sugimoto, Iruma, both of Japan

[73] Assignee: Nippon Conlux Co., Ltd., Tokyo, Japan

[21] Appl. No.: 94,819

[22] Filed: Sep. 9, 1987

[51] Int. Cl.[4] .............................................. G06K 13/06
[52] U.S. Cl. .................................... 235/483; 235/381; 235/480
[58] Field of Search ............... 235/379, 380, 480, 483, 235/384, 381

[56] References Cited

U.S. PATENT DOCUMENTS 3,735,095  5/1973  Mutz et al. ........................... 235/480
4,587,571  5/1986  Anderson et al. ............... 235/483 X Primary Examiner—David L. Trafton
Attorney, Agent, or Firm—Koda and Androlia

[57] ABSTRACT

Disclosed is a read/write apparatus for magnetic card, which includes a card conveyance passage along which a flexible magnetic card is guided. The passage has a direction changing portion where the direction of the passage is gradually changed, and a downstream portion where the passage extends vertically of the apparatus. By virtue of this arrangement the apparatus can be small in depth size and have a thin body.

When an additional insertion button of the apparatus is depressed by a customer, zero value is written on the magnetic card and the card is returned. Upon insertion of an additional card, the sum of the balance of the additional card and the previous card is transmitted to an external information processing unit installed in a vending machine, to permit a single sales operation within the sum of the balances.

15 Claims, 8 Drawing Sheets

READ/WRITE APPARATUS FOR MAGNETIC CARD

BACKGROUND OF THE INVENTION

The present invention relates to a read/write apparatus for reading information out from and writing same on a magnetic card, and more particularly to a read/write apparatus for magnetic card, which apparatus is small in depth size, and is capable of permitting services to be rendered or merchandise to be sold if the price of which is equal to or less than the sum of balances carried in a plurality of magnetic cards.

There is known a read/write apparatus for magnetic card, which is arranged to read information from a magnetic stripe formed in magnetic cards such as bank cards, credit cards, and identification cards, and, where required, to write information on the same magnetic stripe after services are rendered or merchandise is sold. This conventional read/write apparatus for magnetic card is so arranged that a card inserted therein, to have its information read out from its magnetic stripe and new information written thereon, is conveyed in the apparatus in the same direction as one along which the insertion is made. For this reason, the conventional apparatus receiving the magnetic card for services or selling need be thick in depth. However, the read/write apparatus is required to be thin depending on circumstances in which the apparatus is employed. For example, in case that a pinball vending machine for selling balls upon insertion of the magnetic card is installed between pinball machines, a thick pinball vending machine is unusable. Therefore, the magnetic card read/write apparatus to be equipped in the pinball vending machine of this type. must be small in depth size.

Also, there is known a sales system for performing services or selling merchandise, in which information data such as the balance (i.e., an amount orignally carried in the card minus a spent amount) of the inserted card is read out from the magnetic stripe of the card; the difference between the balance of the card and the price of the service rendered or the price of the merchandise sold is calculated; the difference or the renewed balance data is written on the magnetic stripe; and the card is returned to the outside. Also, a magnetic card read/write apparatus is known, which is employed for the sales system of this kind.

In the above-mentioned selling system which responds to the insertion of the magnetic card, if the balance recorded in the magnetic card inserted into the read/write apparatus is less than the price of the services or merchandise, services or merchandise that a customer wishes to obtain is not available.

SUMMARY OF THE INVENTION

It is an object of the present invention to provide a read/write apparatus for magnetic card, which has a reduced depth, and is hence compact in size.

It is another object of the present invention to provide a read/write apparatus for magnetic card, which permits services to be rendered and/or merchandise to be sold under a condition that the price of the services, etc. does not exceed the sum of the balances carried in a plurality of magnetic cards.

According to one aspect of the present invention, a read/write apparatus for magnetic card comprises passage defining means which defines a card conveyance passage along which a flexible magnetic card is conveyed into and out of the apparatus by conveyance means. Detection means detects insertion of the magnetic card into the read/write apparatus and arrival of the magnetic card in at least one predetermined conveyance position, and generates corresponding detection signals upon detection of these occurrences. Control means causes the conveyance means to convey the magnetic card into and out of the apparatus in response to the detection signals. Read/write means reads information from and write same on the magnetic card being conveyed. The card conveyance passage includes a direction changing portion where the direction along which the passage extends is gradually changed, and a downstream portion, extending at a location downstream of the direction changing portion, where the passage extends vertically of the read/write apparatus, whereby the apparatus can have a much reduced depth or a thin body.

According to another aspect of the present invention, there is provided a read/write apparatus for magnetic card, which is adapted to be connected to an external information processing unit which generates a processing completion signal each time information processing based upon the information read from an inserted magnetic card is completed for execution of a single sales operation. The apparatus, by means of read/write means, reads information from and writes same on the magnetic card being conveyed by conveyance means, and causes the information read from the magnetic card to be stored in memory means. Furthermore, the read/write apparatus comprises: additional-card insertion selection means which is operable by a customer to generate a selection representing that a plurality of magnetic cards are usable for a single sales operation; and control means for controlling the conveyance means, the read/write means, and the memory means in response to the selection signal and the processing completion signal. The apparatus operates to cause the magnetic card to be conveyed to the outside upon generation of the selection signal, and cause the sum of information read out from an additional magnetic card inserted subsequently and the information stored in the memory means to be stored in the same memory means. When the processing completion signal is generated, a balance is written on the magnetic card, and then the magnetic card is conveyed outside the read/write apparatus. As a result, a sales operation is permitted so long as the sales price is equal to or less than the sum of the balances of a plurality of magnetic cards inserted.

BRIEF DESCRIPTIONS OF THE DRAWINGS

DETAILED DESCRIPTION

Figure 1:
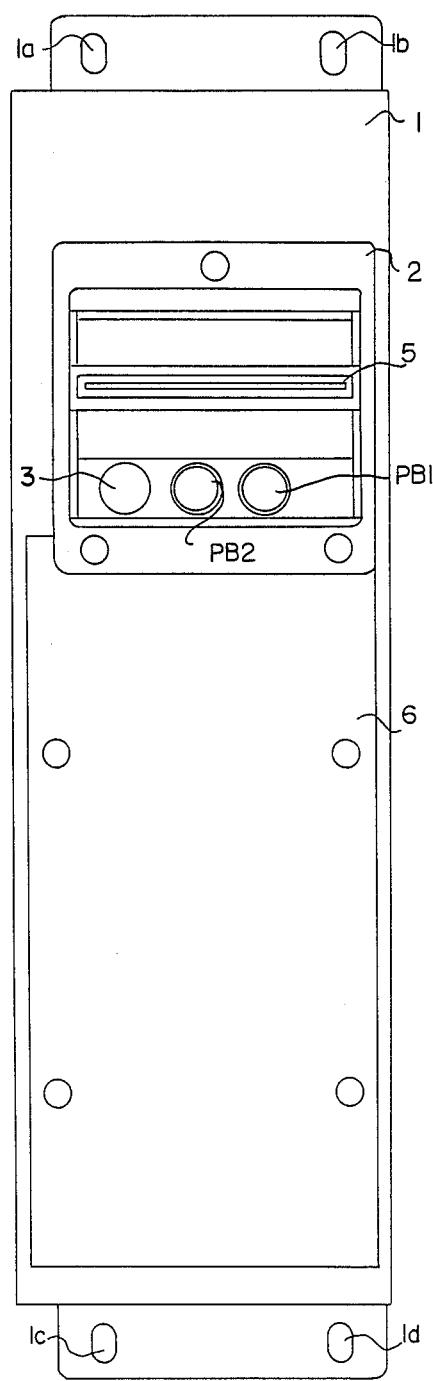
FIG. 1 is a schematic front view of a main body of a read/write apparatus for magnetic card according to an embodiment of the present invention.
Figure 2:
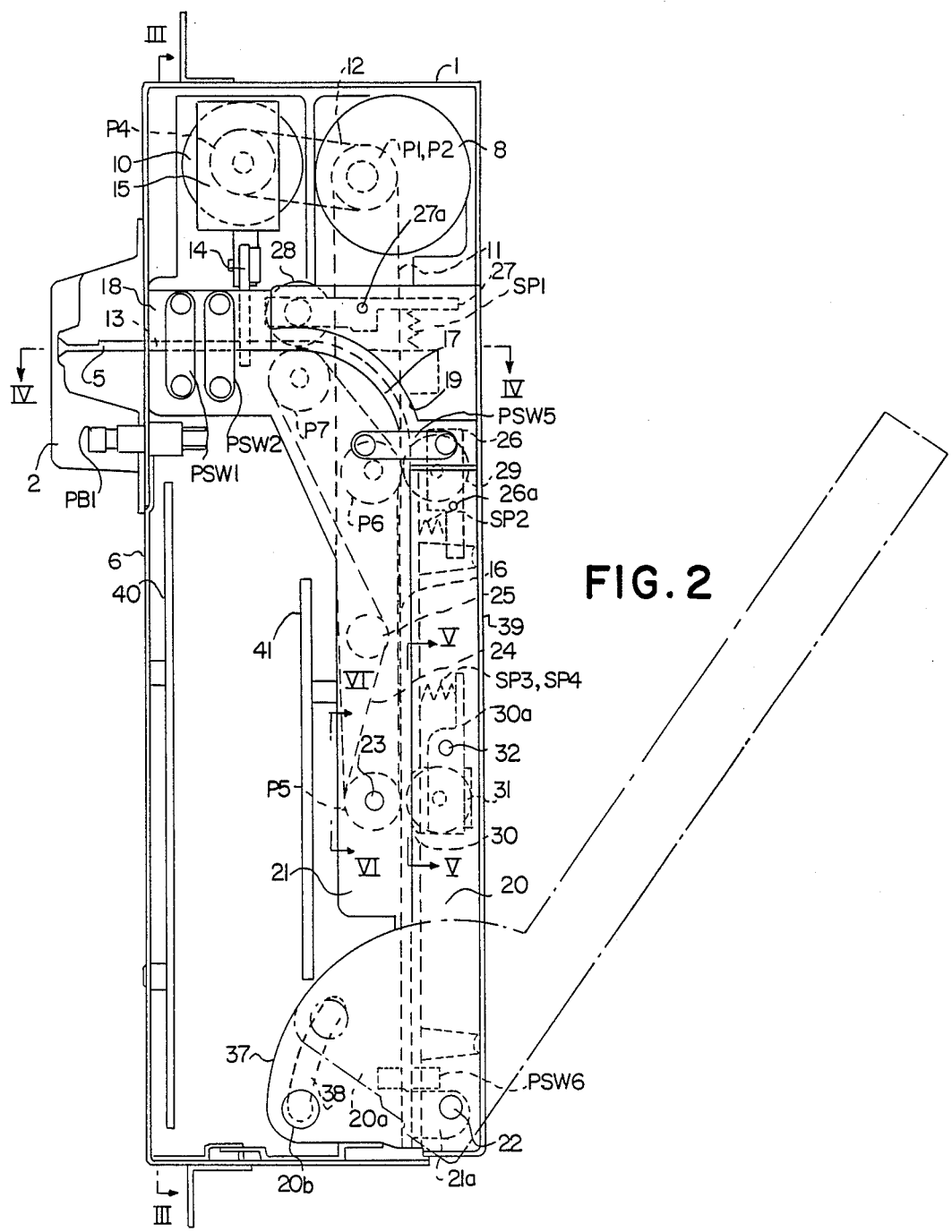
FIG. 2 is a schematic right side view showing the main body of the apparatus of FIG. 1, with a right side wall of a chassis of the apparatus removed.

FIGS. 1 and 2 show a main body of a read/write apparatus for magnetic card, according to an embodiment of the present invention.

Reference numeral 1 designates a chassis of the apparatus, which is formed with holes 1a through 1d at which the apparatus is fixed to a vending machine. Attached to the chassis 1 is a mask 2 which covers a card insertion passage 13. The mask 2 supports a lamp 3 for indicating a condition where a sales operation is permitted, a card return button PB1, and an additional-card insertion button PB2 which is to be depressed by a customer when he wishes to insert an additional magnetic card to supplement shortage of a balance recorded in a magnetic card C (FIG. 4) having been inserted. Further, a card insertion slit 5 is formed in the mask 2 for insertion of the card, and is communicated with the card insertion passage 13. A front cover 6 and the mask 2 are attached to the chassis 1 by means of screws, etc.

Figure 3:
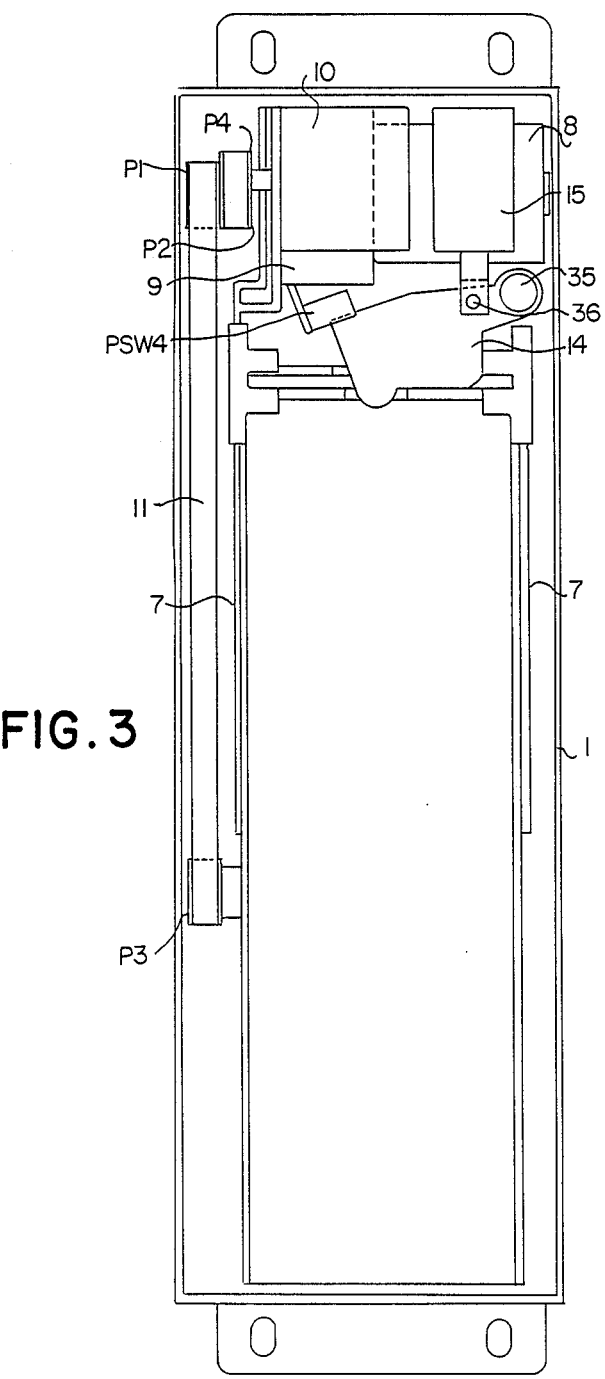
FIG. 3 is a schematic section view taken on line III—III pf FIG. 2.

In FIG. 3, reference numeral 7 designates a pair of side brackets which are supported by the chassis 1 and extend vertically of the main body along side walls of the chassis 1. Mounted on the side brackets 7 are a drive motor 8, a reduction gearing 9 coupled to the output shaft of the motor 8, and a rotary encoder 10, pulleys P1 and P2 being secured to the output shaft of the reduction gearing 9. A drive belt 11 is passed around the pulley P1 and a pulley P3 which is one of pulleys of a card conveyance mechanism, hereinafter described. On the other hand, an encoder drive belt 12 is passed around the pulley P2 and a pulley P4 secured to the rotary shaft of the rotary encoder (FIG. 2). Further, a shutter solenoid 15 is mounted on the side bracket 7, and the plunger of the solenoid is coupled to an entrance shutter 14, hereinafter described.

A pair of lower curve guides 17 are supported by the chassis 1, and each guide 17 has an upstream half portion extending horizontally of the main body, and a downstream half portion extending, as a whole, downwardly and obliquely of the body. A pair of subsidiary curve guides 18 are supported by the side brackets 7, and is disposed above the upstream portion of the lower guide 17 in a manner facing the same upstream portion so as to define the card insertion passage 13 between themselves and the lower guides 17. Further, a pair of upper curve guides 19, supported by the chassis 1, are disposed above the lower guides 17 in facing relation with these guides 17. An upper face of an intermediate portion of the lower guide 17 and an opposite face of the upper guide 19 are shaped into convex and concave circular arcs, respectively, as viewed in their longitudinal cross section. The radius of each circular arc is determined to a value which is in conformity with the flexibility of the card C. Furthermore, a pair of lower card guides 21 disposed adjacent to the lower guides 17 are supported by the chassis 1 and the side brackets 7. Disposed in facing relation with the lower card guides 21 are a pair of upper card guides 20 which are pivotally supported by a shaft 22 so as to be swung toward and away from the lower card guides 21. The above-mentioned respective guides 17 and 19-21 define a card conveyance passage 16 which is communicated with the card insertion passage 13. In a region downstream of the passage 13, the passage 16 extends horizontally inwardly of the main body of the read/write apparatus along the guides 17 and 18, and then extends, as a whole, downwardly and obliquely of the body in a manner tracing a quadrant, as viewed from the side, along the arcuate opposite faces of the guides 17 and 19, and further extends vertically downwardly of the body along the guides 20 and 21. Accordingly, an intermediate portion of the passage 16 gradually changes in its extending direction for 90 degrees along a circular arc having radius which is in conformity with the flexibility of the card C.

Figure 4:
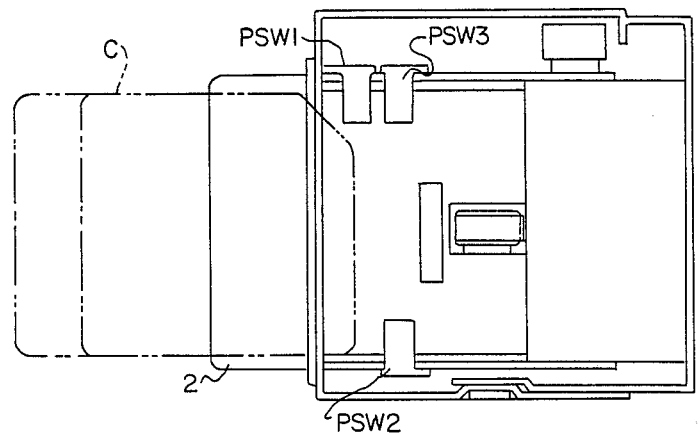
FIG. 4 is a view taken in the direction of the arrows along line IV—IV of FIG. 2.

As shown in FIGS. 2 and 4, three card sensors PSW1-PSW3, photocells, for instance, are respectively attached on the subguides 18 and the lower curve guides 17 in a manner that each sensor embraces a corresponding one side edge portion of the card insertion passage 13. The card sensors PWS2 and PSW3 are disposed in facing relation with each other in the direction transeversely of the passage 13, and the card sensor PSW1 is disposed near the card insertion slit 3 with respect to the sensors PSW2 and PSW3 in the direction along which the passage 13 extends. In other words, these card sensors PSW1-PSW3 are positioned such that when the magnetic card C (FIG. 4) having a front end truncated at its one side edge portion is inserted properly, a predetermined combination of on-off states is established such that the sensors PSW1 and PSW2 are turned on while the sensor PSW3 remains turned off. Further, photocells PSW5 and PSW6 for card detection are disposed at upper and lower ends of a downstream section of the card conveyance passage 16, respectively, which section is defined between upper and lower card guides 20, 21 to extend vertically of the main body of the apparatus (FIG. 2).

At upper portions of the lower curve guides 17 and of the lower card guides 21, card conveyance pulleys P7 and P6 are rotatably supported by these guides, respectively, and are disposed in facing relation with the passage 16. A shaft 23 is rotatably supported by the lower card guides 21 at the lower portions of the same guides, and a conveyance pulley P5 facing the card conveyance passage 16 is secured to the shaft 23 which is driven by the drive belt 11. A conveyance belt 24 is passed around the conveyance pulleys P5-P7, and has its tension adjustable by an idler 25 fixed to a shaft (not shown) which is rotatably supported by the lower card guides 21.

Figure 5:
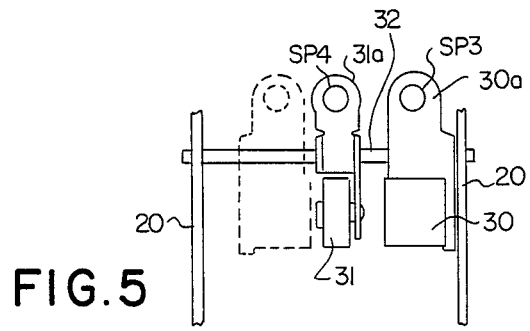
FIG. 5 is a view taken in the direction of the arrows along line V—V of FIG. 2.

A mounting member 27 is pivoted on a shaft 27a fixed at its ends to the upper curve guides 19, and is urged by a spring SP1 counterclockwise, as viewed in FIG. 2. A pinch roller 28 is rotatably supported by the mounting member 27 such that the pinch roller 28 faces the conveyance pulley P7 and is in urged contact with the conveyance belt 24 on the pulley P7. Another mounting member 26 is pivoted on a shaft 26a supported by the card guides 20, and is urged by a spring SP2 counterclockwise, as viewed in FIG. 2. A pinch roller 29 rotatably supported by the mounting member 26 is disposed in facing relation with the conveyance pulley P6 and in urged contact with the belt 24 on the pulley P6. A shaft 32 is fixed at its ends to middle portions of the card guides 20. As is best shown in FIG. 5, a head bracket 30a and a mounting member 31a are pivoted on the shaft 32, and are respectively urged by springs SP3 and SP4 clockwise, as viewed in FIG. 2. Fixed to the lower end of the head bracket 30a is a magnetic head 30 which is movable toward the card conveyance passage 16 together with the head bracket 30a as the same bracket swings clockwise. Further, a pinch roller 31 facing the conveyance pulley P5 is rotatably supported by the lower end portion of the mounting member 31a, such that as the mounting member 31a swings clockwise the pinch roller 31 is brought into urged contact with the conveyance belt 24 on the pulley P5.

Figure 6:
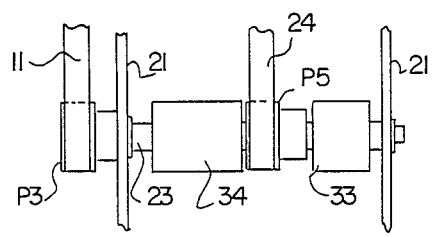
FIG. 6 is a view taken in the direction of the arrows along line VI—VI of FIG. 2.

As shown in FIG. 6, in addition to the drive pulley P3 and the conveyance pulley P5, a pad roller 33 and a dummy roller 34 are secured to the shaft 23 rotatably supported by the lower card guides 21. The pad roller 33 is disposed to face the magnetic head 30, and is operable to bring the inserted card in contact with the magnetic head 30. The dummy roller 34 serves as a pad roller in case that the magnetic head 30 is positioned at an opposite side of the shaft 32 with respect to the pinch roller 31, as indicated by the broken line in FIG. 5, so that the read/write apparatus is adapted to utilization of a card of the type where the magnetic stripe is formed at a different location of the card.

As shown in FIG. 3, the entrance shutter 14 for opening and closing the card insertion passage 13 has its one end pivoted on a pin 35 fixed to the side bracket 7, and is connected at its intermediate portion to the plunger of the shutter solenoid 15 via a pin 36. The shutter 14 is arranged to assume the position shown in FIG. 3 by virtue of its own weight or gravity, to close the card insertion passage 13 when the solenoid 15 is de-energized; on the other hand, when the solenoid 15 is energized and its plunger recedes thereby, the shutter 14 is caused to swing clockwise about the pin 35, as viewed in FIG. 3, to make the card insertion passage 13 open. A sensor PSW4 is disposed in a manner facing one end portion of the entrance shutter 14 remote from the pin 35, so as to detect the arrival of the entrance shutter 14 to its position where the card insertion passage 13 is open.

In FIG. 2, a shaft 22 is fixed at its ends to projections 21a which extend from lower portions of the lower card guides 21, so as to rotatably support the upper card guides 20. Fixed to the lower card guides 21 are guide members 37 each of which is formed with an arcuate guide slot 38 which slidably engages with a pin 20b planted in a lower end portion 20a of the upper card guides 20, the lower end portion 20a being roughly congruent in shape with the guide member 37. The pin 20b is arranged to slide along the guide slot 38 to reach the upper end of the same slot 38, as the upper card guides 20 are swung clockwise in FIG. 2, so as to hold the upper card guides 20 at their open position where access to the interior of the read/write apparatus is permitted so that a magnetic card stranded in the card conveyance passage 16 can be easily removed, and repair, cleaning and other maintenance works of the apparatus are facilitated. Incidentally, reference numeral 39 designates a back cover whose side edges are fixed to the respective upper card guides 20 by screws, for instance. Reference numerals 40 and 41 designate a main board and an interface board fixed to the front cover 6 and the side bracket 7, respectively, on which control circuits (not shown) are mounted.

Next, an explanation will be given as to a card conveyance operation of the read/write apparatus for magnetic card constructed as above.

As the magnetic card C is properly inserted through the card insertion slit 5 formed in the mask 2, the entrance sensors PSW1 and PSW2 are turned on, while the entrance seonsor PSW3 remains turned off, whereupon the shutter solenoid 15 is energized. As a result, the entrance shutter 14 is lifted to open the card insertion passage 13. At the same time, the drive motor 8 is energized to rotate the drive pulley P3 via the drive pulley P1 and the drive belt 11. With rotation of the pulley P3, the shaft 23 and the conveyance pulley P5 rotate to drive the conveyance belt 24. Under these conditions, as the magnetic card C is inserted deeper, the front edge of the card is pinched between the pinch roller 28 and the conveyance belt 24 running on the conveyance pulley P7, whereupon the magnetic card C is pulled by the moving conveyance belt 24 into the card conveyance passage 16, and the card C is conveyed horizontally. Then, guided by the lower and upper curve guides 17 and 19, the card C enters the downstream side of the card passage 16, where by virtue of its flexibility the card C warps along the arcuate guide faces of the respective guides 17, 19. Thereafter, the front edge of the card C comes to be pinched between the pinch roller 29 and the conveyance belt 24 on the conveyance pulley P6 before the rear edge of the card C leaves the roller 28 and the pulley P7, and thus the card C is conveyed downstream carried on the conveyance belt 24. Next, the card C is pinched between the pinch roller 31 and the conveyance belt 24 on the conveyance pulley P5, to be carried further down. While passing through this conveyance region, the magnetic card C is pressed on the magnetic head 30 by the pad roller 33, so that the information recorded on the magnetic stipe formed in the magnetic card C is read out by means of the magnetic head 30. When the front edge of the magnetic card C is sensed by the sensor PSW6, the drive motor 8 is stopped.

Next, to return the magnetic card C, the drive motor 8 is rotated in the reverse direction to drive the conveyance belt 24 in the reverse direction. As a result, the magnetic card C is conveyed backward, and new information is written on the magnetic stripe of the magnetic card C by means of the magnetic head 30 during the conveyance of the card, and the same card is discharged from the card insertion slit 5 of the mask 2 after passing the card insertion passage 13.

Incidentally, while the magnetic card C is being conveyed, the motor 8 causes the rotary encoder 10 to rotate in synchronism with the conveyance of the card, through the pulley P2 secured to the output shaft of the reduction gearing 9, the encoder drive belt 12, and the pulley P4 secured to the shaft of the rotary encoder 15, whereby the conveyance position of the magnetic card C is detected.

Figure 7:
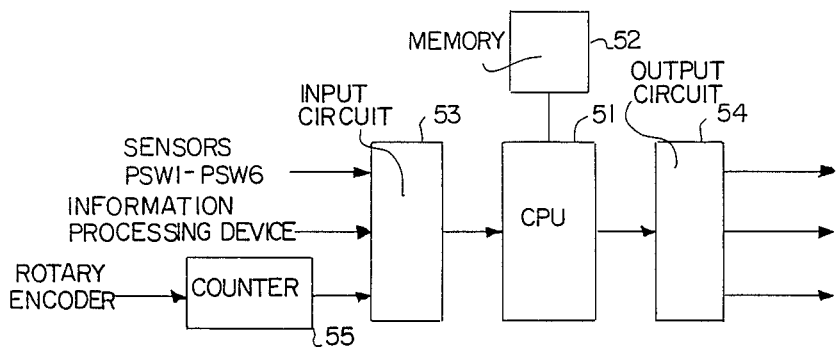
FIG. 7 is a schematic block circuit diagram of a control system which cooparates with the main body to constitute the read/write apparatus.

FIG. 7 exemplarily shows a control system which cooperates with the above-mentioned main body to constitute the whole arrangement of the read/write apparatus. Reference numeral 51 designates a microprocessor (hereinafter referred to as the CPU), and 52 a memory composed mainly of a ROM storing therein the control program and a RAM which is used to temporarily store data. An input circuit 53 is connected to the sensors PSW1–PSW6, an external information processing device provided in the vending machine, and a reversible counter 55 for counting the number of output pulses supplied from the rotary encoder 10. An output cirucit 54 is connected to the drive motor 8, the shutter solenoid 15, and the information processing device.

Next, the operation of the read/write apparatus will be described with reference to FIGS. 8a through 8d. The CPU 51 continually detects through the input circuit 53 whether or not the predetermined on-off states such that the sensors PSW1 and PSW2 are turned on while the sensor PSW3 is turned off is established (steps S1–S3). If the magnetic card C is properly inserted to establish the predetermined on-off states, the shutter solenoid 15 is energized (step S4), whereby the solenoid 15 is operated so that the entrance shutter 14 swings clockwise about the pin 35, as viewed in FIG. 2, to thereby make the card insertion passage 13 open. When the sensor PSW4 detects this swinging motion of the entrance shutter 14 (step S5), the motor 8 is driven (step S7). If the sensor PSW4 is not turned on even when the shutter solenoid 15 is energized at step S4, the solenoid 15 is turned off (step S6), so that the program returns to the standby state to allow repetition of steps S1 et seq.

With forward rotation of the drive motor 8, the reduction gearing 9, the drive pulley P1, the drive belt 11, and the drive pulley P3 rotate forwardly, therby rotating the shaft 23 in the forward direction. This rotation of the shaft 23 causes the forward rotation of the conveyance pulley P5, whereby the conveyance belt 24 passed around the conveyance pulleys P5–P7 runs in the forward direction. On this occasion, if the magnetic card C is inserted deeply enough to have its front edge pinched between the pinch roller 28 and the conveyance belt 24 on the conveyance pulley P7, the card C is pulled in and, guided by the upper and lower curve guides 19, 17, is conveyed downstream, with a 90° turn from the horizontal direction into the vertical direction. When the front edge of the magnetic card C comes close enough to the sensor PSW5, the same sensor PSW5 is turned on (step S8), whereupon the CPU 51 starts the timer T1 provided in the CPU 51 (step S9). Then, the magnetic card C, having its front edge pinched between the pinch roller 29 and the conveyance belt 11 on the conveyance pulley P6, is conveyed downstream by the conveyance belt 24 running in the forward direction. When the rear edge of the card C has left the sensor PSW5 far enough, the sensor PSW5 is turned off (step S10), whereupon the shutter solenoid 15 is de-energized to thereby block the card insertion passage 13 with the entrance shutter 14 (step S11). By virtue of this arrangement, if the card C happens to be tailed with a tape or a string, which is done for the purpose of cheating the vending machine, then the entrance shutter 14 catches the tape or the string, to thereby prevent the card C from being conveyed further. If the magnetic card C inserted is a normal card, the CPU 51 starts picking up information from the magnetic stripe formed in the magnetic card C (step S12). On this occasion, the magnetic card C is pressed onto the magnetic head 30 by the pad roller 33. In synchronism with a signal from the rotary encoder 10, the CPU 51 reads the information from the magnetic stripe by means of the magnetic head 30 disposed in sliding contact with the card C. While reading the information, the CPU 51 detects whether a predetermined time which is set in the timer T1 has elapsed before the sensor PSW6 is turned on (steps S13, S14). If the timer T1 has been up before the sensor PSW6 is turned on, the CPU 51 determines that there is something abnormal in the conveyance of the card C, and therefore stops the forward rotation of the drive motor 8 (step S15), and at the same time permits execution of a card return processing, described later with reference to steps S29 et seq. On the other hand, if the magnetic card C is conveyed normally, while its information is being read out normally, then it reaches the terminal of the card conveyance passage 16 to thereby turns the sensor PSW6 on (step S13) before the timer T1 is up. Upon detection of the turning on of the sensor PSW6, the CPU 51 stops the drive motor 8 (step S16).

Next, the CPU 51 transmits the acquired information to the information processing unit installed in the vending machine, or the servicing machine, etc. wherein the read/write apparatus for magnetic card is built in, and at the same time the CPU 51 adds the same information to a content of an MA register (step S17). In the case of a vending machine, the information processing unit allows the machine to yield an article of merchandise if the price thereof is equal to or less than the balance read from the card C. When the article of merchandise is yielded, the information processing unit transmits a sales completion signal to the read/write apparatus. After supplying the information processing unit with the data, the CPU 51 detects whether or not either one of an additional-card insertion selection signal and a card return signal has been generated (steps S18, S19), which signals are generated in response to depression of the additional card insertion button PB2 and the card return button PB1, respectively.

If the CPU 51 receives the sale completion signal (step S20) without having received the additional-card insertion selection signal or the card return signal, the CPU 51 reads and stores the sold amount X supplied together with the sales completion signal (step S21), and then the difference between the pre-sales value stored in the MA register and the sold amount X is obtained and stored in the MB register (step S22). In the case where the information processing unit is designed such that it supplies the CPU 51 with the after-sales balance instead of the sold amount X, there is no need of providing step S22.

Figure 8A:
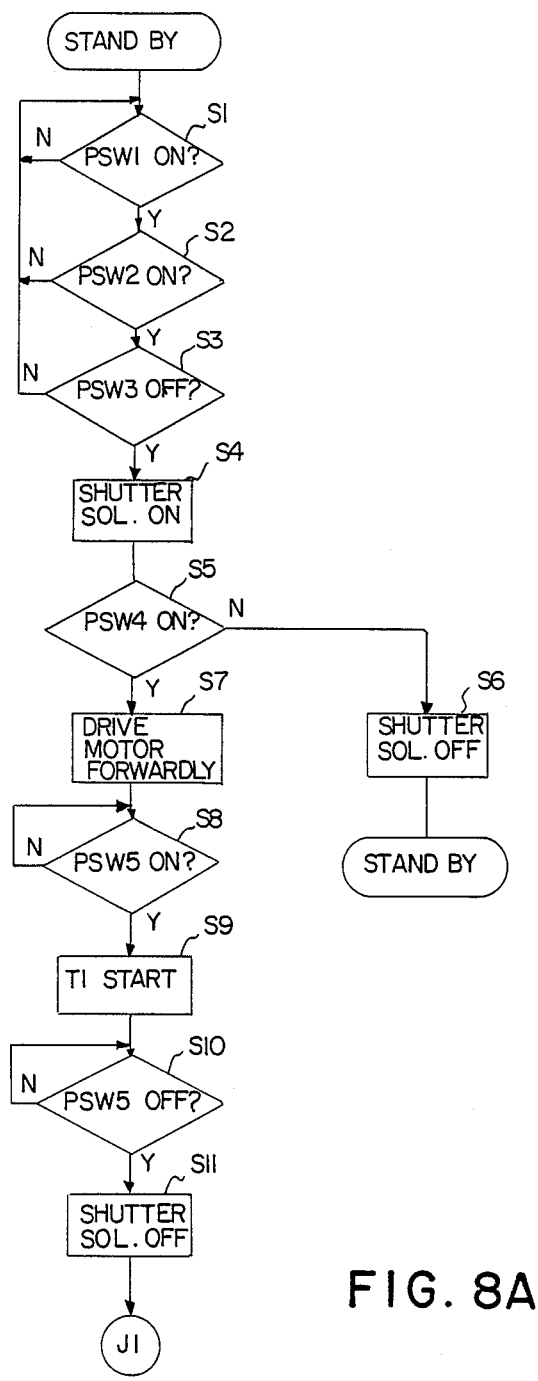
FIGS. 8a through 8d show a flowchart of a control program which is executed by a CPU in FIG. 7.
Figure 8B:
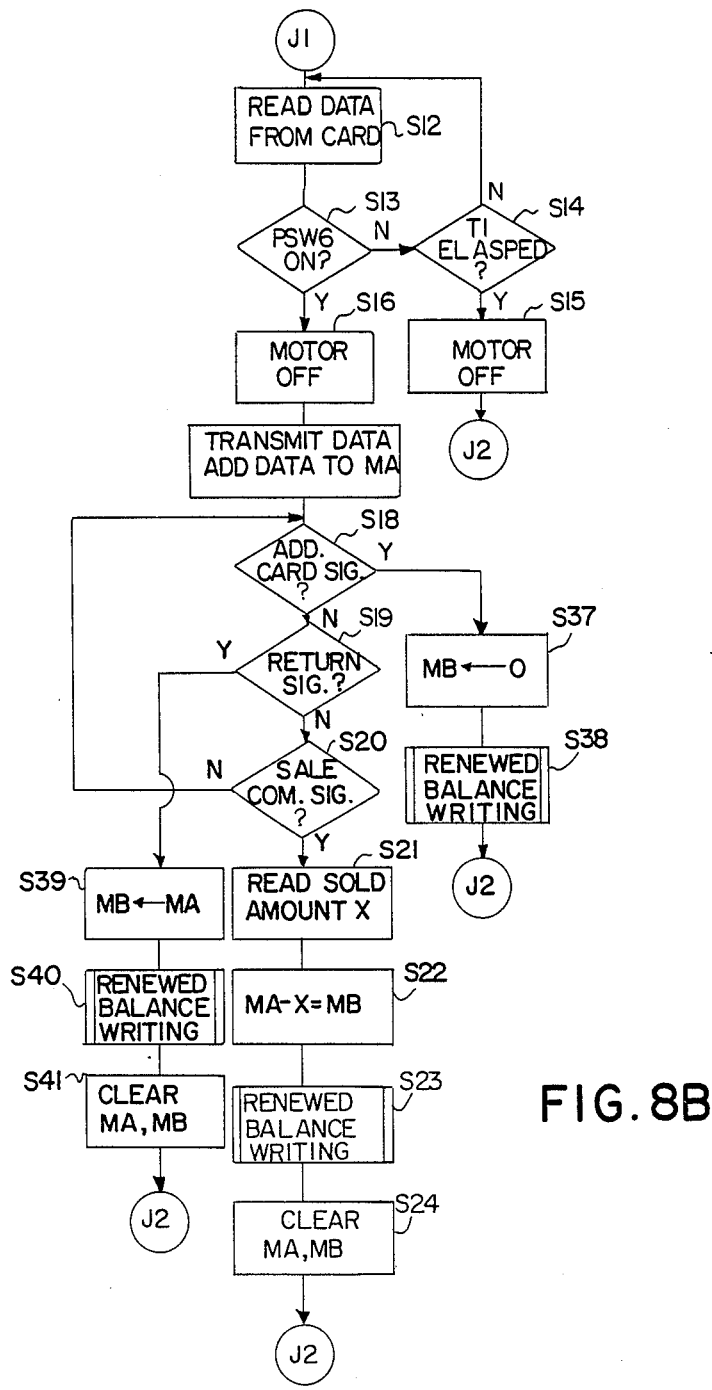
Figure 8C:
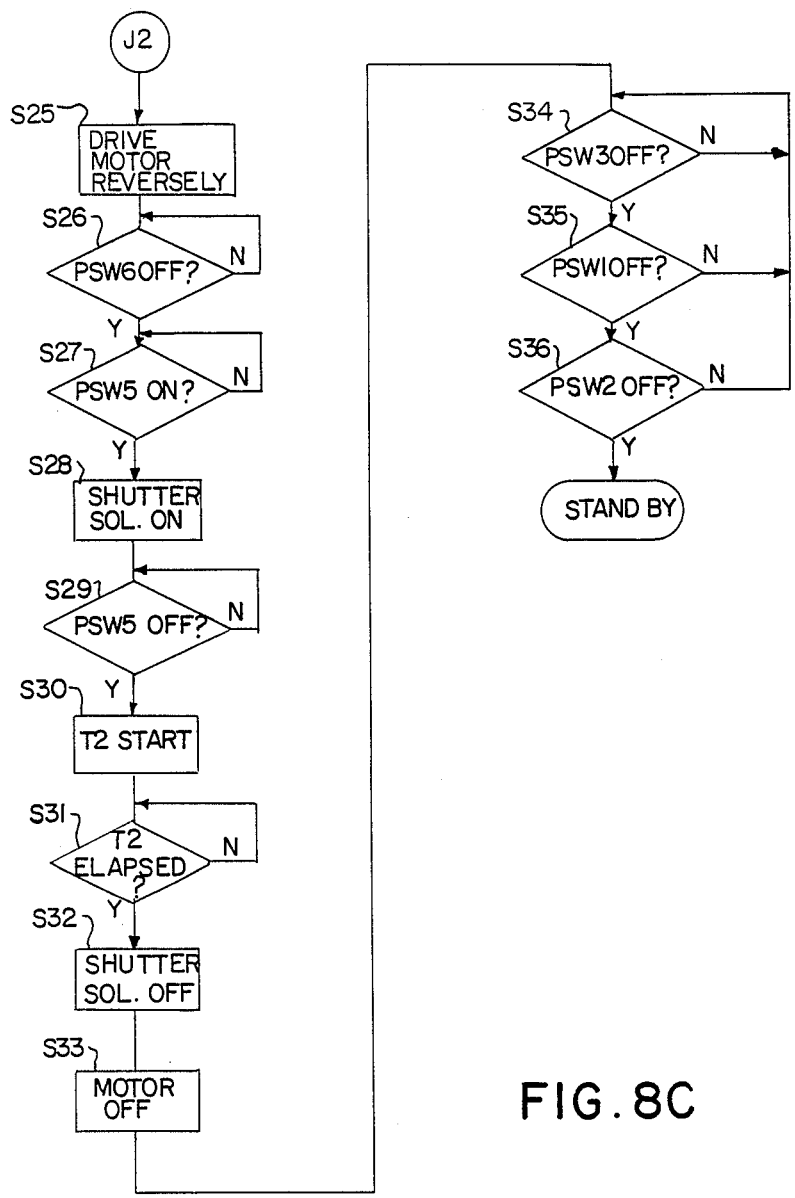
Figure 8D:
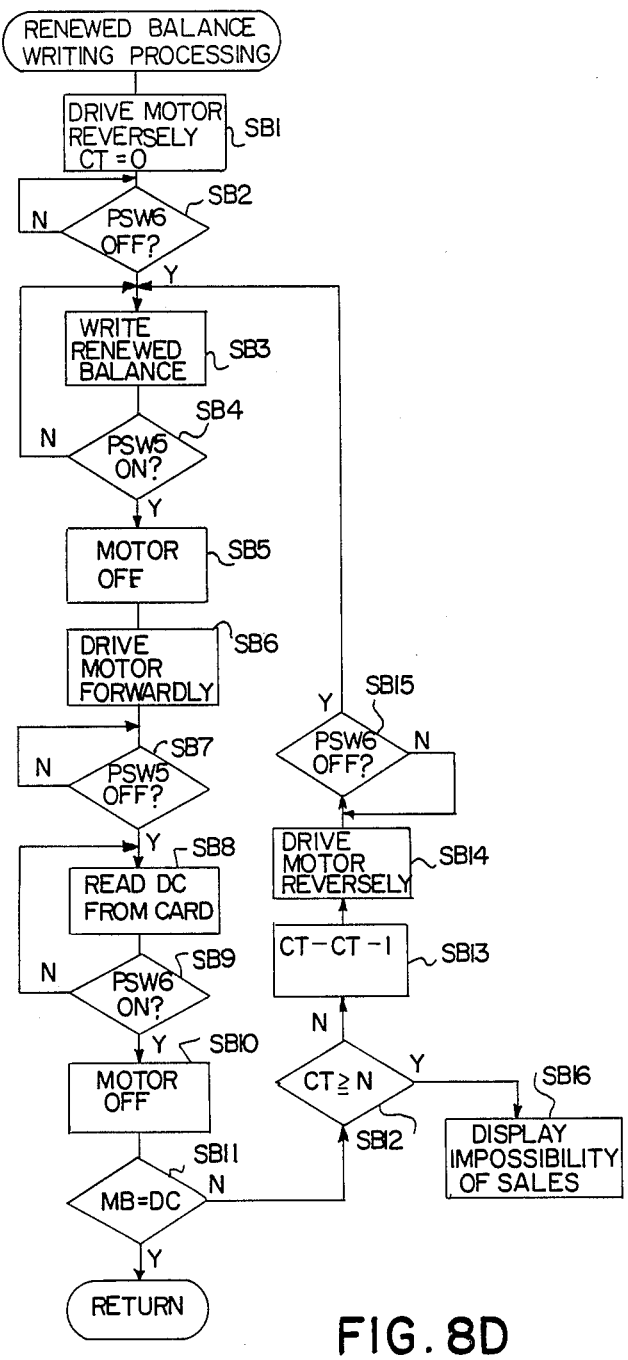

Thereafter, processing of writing of the renewed balance to the card C is executed (step S23). In this writing processing, as shown in FIG. 8D, the drive motor 8 is rotated reversely to convey the magnetic card C backward on the reversely running conveyance belt 24, and meanwhile a value in a counter CT indicating the number of times that written information (mentioned later) is not equal to a balance, is reset to zero (step SB1). When the magnetic card C is conveyed backward and then the sensor PSW6 is turned off (step SB2), the CPU 51 starts writing the new balance (the value in the MB register) on the magnetic stripe of the card by means of the magnetic head 30, such writing operation being continued until the sensor PSW5 is turned on (steps SB3, SB4), which occurs as the rear edge of the magnetic card C reaches the vicinity of the sensor PSW5. When the sensor PSW5 is thus turned on (step SB4), the drive motor 8 is stopped rotating reversely (step SB5), and is started to rotate in the forward direction (step SB6). Then, the magnetic card C is brought downstream again along the card conveyance passage 16, whereby the sensor PSW5 is turned off (step SB7), and the CPU 51 reads the information DC written on the magnetic stripe by means of the magnetic head 30 (step SB8). When the sensor PSW6 is turned on, the drive motor 8 is stopped (steps SB9, SB10), and it is determined whether or not the read value DC is equal to the value in the MB register, that is, whether or not the value MB was correctly written on the card C (step SB11).

If the read data DC and the value of the register MB do not agree, it is determined whether or not the value of the CT counter is equal to or greater than a predetermined value N (step SB12). If the value CT is less than the predetermined value N, the CT counter adds one to its registered value (step SB13), and the drive motor 8 is started to rotate in the reverse direction (step SB14) to convey the card C backward. When the sensor PSW6 is turned off (step S15), the program returns to step SB3 to repeat the same procedure (steps SB3 et seq.) so as to write the balance again and the written value is verified. When it is determined at step SB12 that the value CT exceeds the predetermined value N, the CPU 51 transmits a sales prohibition signal to the information processing unit, so that impossibility of sales is displayed by a suitable means (step SB16).

If the data DC, which was written and read to be verified, is equal to the balance stored in the MB register (step SB11), the program returns to the main routine, so as to execute the card return processing at steps S24 et seq. More specifically, the MA register and the MB register are reset to zero (step S24), and then the drive motor 8 is rotated in the reverse direction (step S25) to convey the magnetic card C backward. As a result, the sensor PSW6 is turned off, and the sensor PSW5 is turned on (steps S26, S27), and then the shutter solenoid 15 is energized to lift the entrance shutter 14 (step S28). When the front edge of the card C has passed the sensor PSW5 to cause the latter to be turned off (step S29), a T2 timer is started (step S30). When a predetermined time period set in the T2 timer has elapsed, the shutter solenoid 15 is de-energized to block the card passage 16 with the entrance shutter 14 and at the same time the drive motor 8 is stopped rotating in the reverse direction (steps S31-S33). The predetermined time period of the timer T2 is set to such a value within which the magnetic card C having caused the sensor PSW5 to be turned off can clearly pass the entrance shutter 14; therefore, the magnetic card C has been conveyed upstream so far beyond the entrance shutter 14 that the rear edge of the magnetic card C sticks out from the card insertion slit 5. When the magnetic card C is removed causing all of the entrance sensors PSW1-PSW3 to be turned off (steps S34-S36), the magnetic card read/write apparatus is restored to the standby state.

Next, the operation of the read/write apparatus will be explained in case where two cards are used to purchase an article of merchandise, etc.

As a magnetic card C is inserted, information concerning the balance is read therefrom, and is transmitted to the information processing unit of the vending machine, or the like, in which the read/write apparatus is installed. Then the vending machine indicates by means of a suitable indicator those articles of merchandise which can be purchased with the card C. Let it be supposed that the price of the article that the customer wishes to purchase is greater than the balance recorded in his card C, and that, therefore, the indicator informs him of the fact. If the customer still wishes to purchase the article, he is required to press the additional-card insertion button PB2, whereby the additional-card insertion selection signal is transmitted to the CPU 51 (step S18), which signal represents that insertion of a plurality of magnetic cards should be accepted in a single sales operation, i.e., these cards are usable for the sales operation. The CPU 51, upon receipt of the signal, sets the value of the MB register to zero (step S37), and the steps SB1-SB16 are executed whereby the registered value MB is written on the card C (step S38). As a result, the balance written on the card C becomes zero. After this, the steps S25 et seq. are executed whereby the magnetic card C is returned to the customer. Incidentally, instead of returning the magnetic card C to the customer, it may be programmed such that the card C is collected in a hopper provided in the read/write apparatus or such that the card C is returned to the customer in a form no longer usable—for example, the magnetic stripe is demagnetized, or a part of the card C is punched off.

Here, the value recorded in the returned magnetic card C is stored in the register MA. The customer now is required to insert another magnetic card C, from which its balance is read, and transmitted to the information processing unit, and at the same time, such value is added to the value stored in the register MA (steps S1-S17). Then, the vending machine is rendered ready to yield those articles of merchandise whose respective prices are less than or equal to the sum of the balances of these two cards. The steps S18 et seq. are then undergone to execute the already explained processing.

Next, an explanation will be given as to the case where the customer presses the card return button PB1 prior to execution of the sales operation. Upon detection of the card return signal (step S19), the CPU 51 writes the value of the MA register in the MB register (step S39), and the balance writing processing is executed (step S40). More specifically, as the card return button PB1 is pressed, the value read from the magnetic card C is stored as the balance in the MB register, and then this balance is written on the magnetic card C. In this balance writing processing at the step S40, the same procedures as those at the steps SB1-SB16 are executed. When the balance writing processing is completed, the registers MA, MB are cleared (step S41), and the card return processing at steps S25 et seq. is executed whereby the card C is returned, and then the standby state is restored.

In the above explanation, tow magnetic cards alone are used consecutively, but the read/write apparatus can accept more than two magnetic cards for a single sales operation.

In the above embodiment, the information processing unit is installed outside the read/write apparatus, but it may be incorporated in the read/write apparatus.

What is claimed is:

1. A read/write apparatus for magnetic card, comprising:
   passage defining means defining a card conveyance passage along which a magnetic card having flexibility is guided;
   conveyance means for conveying the magnetic card forward and backward along said card conveyance passage;
   detection means for detecting insertion of the magnetic card into said read/write apparatus and arrival of the magnetic card in at least one predetermined conveyance position, and for generating corresponding detection signals upon detection of those occurrences;
   control means responsive to said detection signals supplied from said detection means for controlling said conveyance mean so that the magnetic card is conveyed forward and backward by said conveyance means; and
   read/write means for reading information from and writing same on the magnetic card being conveyed;
   said card conveyance passage including a direction changing portion where a direction along which said conveyance passage extends is gradually changed, and a downstream portion which extends downstream of said direction changing portion and extends vertically of said read/write apparatus, said read/write means being disposed in facing relation with said downstream portion of said card conveyance passage.

2. A read/write apparatus as claimed in claim 1, wherein said direction changing portion of said card conveyance passage is formed such that it gradually changes the direction of said passage from horizontal to vertical.

3. A read/write apparatus as claimed in claim 1 or 2, wherein said direction changing portion has, in its logitudinal cross section, a profile of a circular arc having a predetermined radius.

4. A read/write apparatus as claimed in claim 3, wherein said predetermined raius is determined to a value which is in conformity with the flexibility of the magnetic card.

5. A read/write apparatus as claimed in claim 1, wherein said conveyance means includes a plurality of pulleys which are rotatably supported by said passage defining means, a conveyance belt passed around said pulleys, and a motor for driving at least one of said pulleys.

6. A read/write apparatus as claimed in claim 1, wherein said read/write means includes a magnetic head.

7. A read/write apparatus as claimed in claim 1, wherein said read/write appapatus includes a card insertion slit and a card insertion passage by way of which said card insertion slit communicates with said card conveyance passage, said detection means including a plurality of sensors which are disposed in facing relation with said card insertion passage and at least one predetermined position of said card conveyance passage.

8. A read/write apparatus for magnetic card adapted to be connected to an external information processing unit which is operable to generate a processing completion signal each time information processing for execution of a single sales operation on the basis of information read from a magnetic card is completed, said read/write apparatus comprising:

conveyance means for conveying the magnetic card into and out of said read/write apparatus;

read/write means for reading information from and writing same on the magnetic card being conveyed;

memory means for storing the information read from the magnetic card;

additional insertion selection means operable by a customer, for generating a selection signal indicating that a plurality of magnetic cards are usable for the single sales operation;

control means responsive to said selection signal from said additional insertion selection means and said processing completion signal from said external information processing unit, for controlling said conveyance means, said read/write means, and said memory means;

whereby, upon generation of said selection signal, a magnetic card is conveyed outside said read/write apparatus, and the sum of information read from an additional magnetic card subsequently inserted and information stored in said memory means is stored in said memory means, and, upon generation of said processing completion signal, the magnetic card on which its balance is written is conveyed outside said read/write apparatus.

9. A read/write apparatus as claimed in claim 8, wherein said external information processing unit is operable to generate a signal indicative of a sold amount upon completion of the information processing, said read/write apparatus being operable to obtain the balance by subtracting the sold amount supplied from said external information processing unit from the information stored in said memory means when said processing completion signal is generated.

10. A read/write apparatus as claimed in claim 8, wherein, upon generation of said selection signal, information indicative of zero balance is written on the magnetic card, before the magnetic card is conveyed outside said read/write apparatus.

11. A read/write apparatus as claimed in claim 8, 9 or 10, further comprising:

card return selection means operable by the customer, for generating a card return signal indicating that the customer requests phohibition of the single sales operation;

wherein, upon generation of the card return signal, the magnetic card is conveyed outside said read/write apparatus after the information stored in said memory mean is written in the magnetic card.

12. A read/write apparatus as claimed by claim 6, wherein said magnetic head is pivotally mounted.

13. A read/write apparatus as claimed by claim 1, further comprising:

a card insertion slit;

a card insertion passage provided between said card insertion slit and said card conveyance passage; and an entrance shutter for opening and closing said card insertion passage.

14. A read/write apparatus as claimed in claim 1, wherein said passage defining means further includes an access portion which may be opened and closed with respect to the apparatus whereby an interior of said apparatus may be easily accessed.

15. A read/write apparatus as claimed by claim 1, wherein said apparatus is a magnetic card reader and writer for a vending machine.

* * * * *